July 17, 1923.
G. CAPRONI
1,462,100
DEVICE FOR DETERMINING THE COURSE ON FLYING MACHINES
Filed May 28, 1919
2 Sheets-Sheet 1
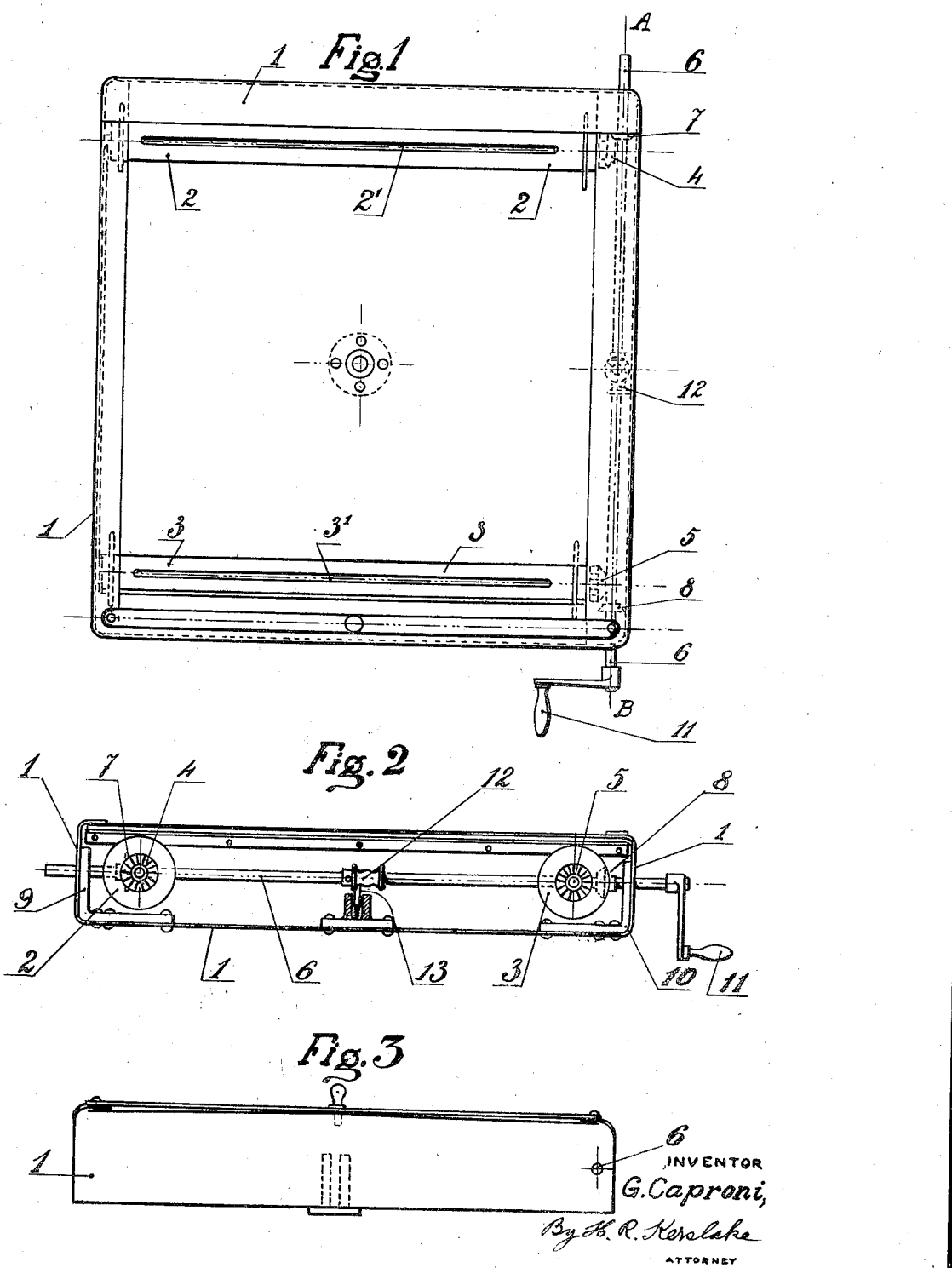

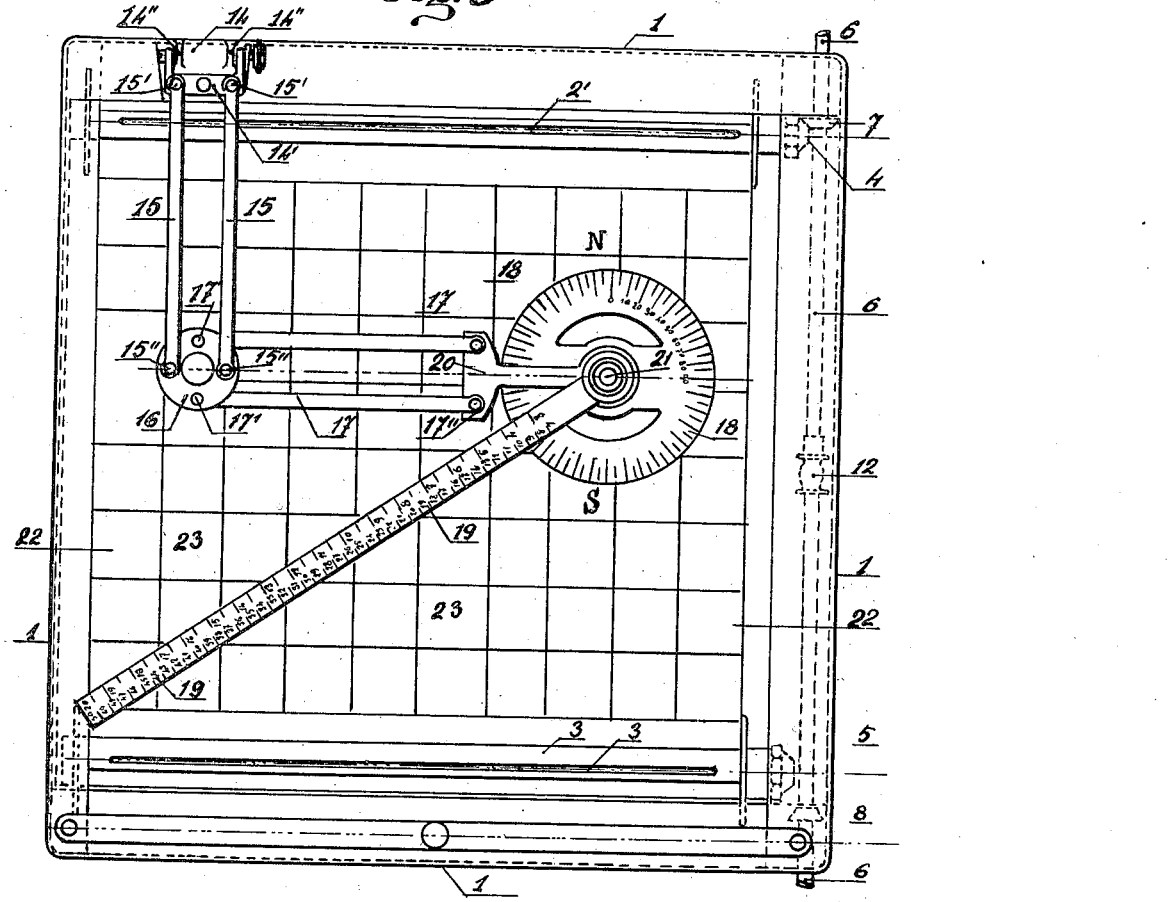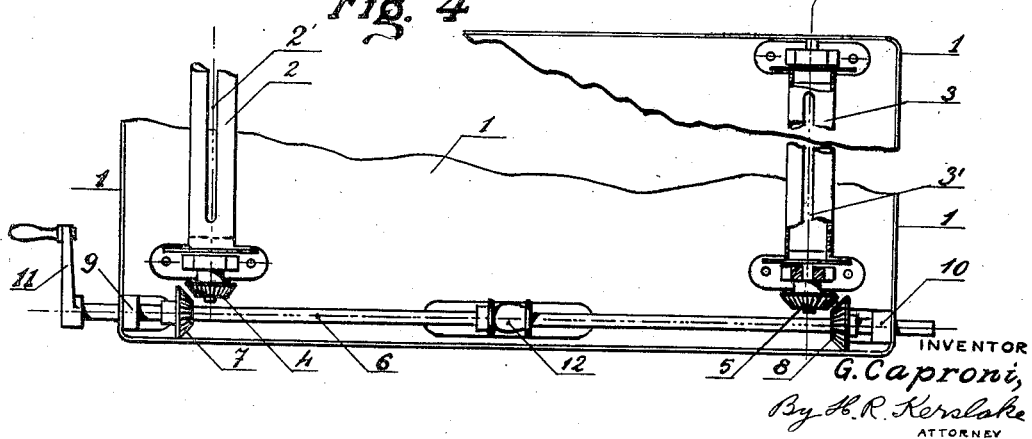

Patented July 17, 1923.

1,462,100

UNITED STATES PATENT OFFICE.

GIANNI CAPRONI, OF MILAN, ITALY.

DEVICE FOR DETERMINING THE COURSE ON FLYING MACHINES.

Application filed May 28, 1919. Serial No. 300,274.

*To all whom it may concern:*

Be it known that GIANNI CAPRONI, a subject of the Kingdom of Italy, residing at Milan, Via Durini No. 24, Italy, has invented certain new and useful Improvements in Devices for Determining the Course on Flying Machines, of which the following is a specification.

The object of the invention is to provide a flying machine with a device providing for the rapid correction of the course by reference to visible points on the land below.

With this object in view the invention comprises a frame combined with a deformable parallelogram device substantially similar to the drafting instrument described in the Patent, 1,081,758, and a chart stretched on said frame below the said parallelogram device.

The invention will be better understood with reference to the annexed drawing of which:

Fig. 1 is a plan view of the map-box,

Fig. 2 is a section on line —A—B— of Fig. 1,

Fig. 3 is an elevational view of said box,

Fig. 4 is a partial plan view of said box of which the upper board is removed.

Fig. 5 is a plan view of said box combined with the geometrical apparatus.

The box —1— of rectangular form, is provided at the interior with cylinders —2—3—, whereon to roll the map, slots —2'—3'— being provided on said cylinders to fix one end of the map.

To roll and unroll said map on said cylinders a driving gear is provided, comprising toothed wheels —7—8— mounted on shaft —6— at right angle to said cylinders, said shaft being pivoted on bearings —9—10—. A hand crank —11— is connected to the outside projecting portion of said shaft. Said shaft being slidably mounted on the bearings —10—9— may be brought to gear with one or the other of wheels —4—5—.

A permanent gear is assured by means of a doubly grooved snap-ring —12— fixed on shaft —6— rolling against a spring click —13— (Fig. 2).

By exerting a pull or a push on shaft —6—, pin —13— will jump from one groove to the other of snap-ring —12— and the shaft will gear with one or the other of wheels —4—5—.

In this way the geared cylinder is always that which drives the map, rolled on the loose cylinder.

The map is stretched on the cover or upper board —1'— of the box, said map being screened by a transparent plate —22— of glass or other material such as celluloid, mica and the like. Said plate is provided with square divisions —23— to divide the map in definite sections.

A geometrical apparatus comprising a plate —14— fixed on one side of box —1— with supports —14''— on which is pivoted a bridge —14'—, said bridge bearing pivot connections —15'— for the ends of rods —15—; a disc —16— bears pivot connections —15''— for the other ends of rods —15— and pivots —17'— for the ends of rods —17— the other ends of said rods —17—, being pivoted at —17''— on piece —20—. —18— is a protractor which is pivoted at —21— on the middle line of piece —20—, on the same pivot 21 is mounted a rule —19— provided with scale in units of length, and a scale in miles, to suit the scale of the map.

The geometric arrangement is similar to that drawing instrument called goniometric and map holder air-craft steering device.

The operation of the apparatus is the following: The protractor is brought with its —zero— in the direction of the north. With reference to a point of the land above which the machine flies, rule —19— is brought with one side coincident to said point on the map and to the point towards which the flight is directed. The protractor —18— being maintained through the aid of the compass with its —zero— towards the north. The rule will indicate on the protractor the course.

Having now described and ascertained the nature of my invention and in what manner the same should be performed, I claim:—

1. A device of the character described including a casing having a transparent top provided with graduated lines dividing said transparent top into a number of squares, a map movably mounted in said casing beneath said transparent top, a deformable double parallelogram device mounted on said casing and bearing against said transparent top, a protractor and a rule attached to the movable end of said parallelogram device, and means to permit said parallelogram device to be raised from said transparent top.

2. A device of the kind defined by claim 1 including means arranged in said casing for rolling said map.

3. A device of the kind described comprising a casing provided with a transparent top having transverse and longitudinal lines dividing its area into squares, rollers mounted in said casing, a map mounted on said rollers and movable beneath said transparent top, means for actuating said rollers, a deformable double parallelogram device mounted on said casing and bearing against said transparent top, a member carried by said double parallelogram device and having a pivot pin, a protractor and a rule mounted on the last mentioned pivot, and means to permit said parallelogram device to be shifted away from said transparent top.

In testimony whereof I affix my signature in the presence of two witnesses.

GIANNI CAPRONI.

Witnesses:
E. E. GUANNIERY,
R. L. McLAUGHLIN.